Sept. 19, 1950 J. M. TYRNER 2,522,851
AUTOMATICALLY STEERED TRACER
Filed July 16, 1949 3 Sheets-Sheet 1

INVENTOR
JOSEPH M. TYRNER
BY
ATTORNEYS

Sept. 19, 1950   J. M. TYRNER   2,522,851
AUTOMATICALLY STEERED TRACER
Filed July 16, 1949   3 Sheets-Sheet 3
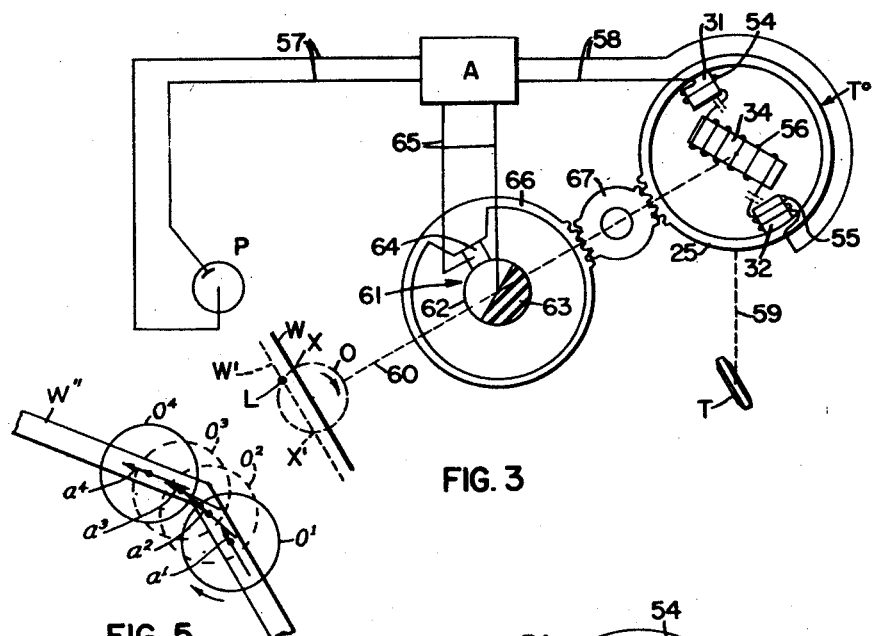
FIG. 3
FIG. 5
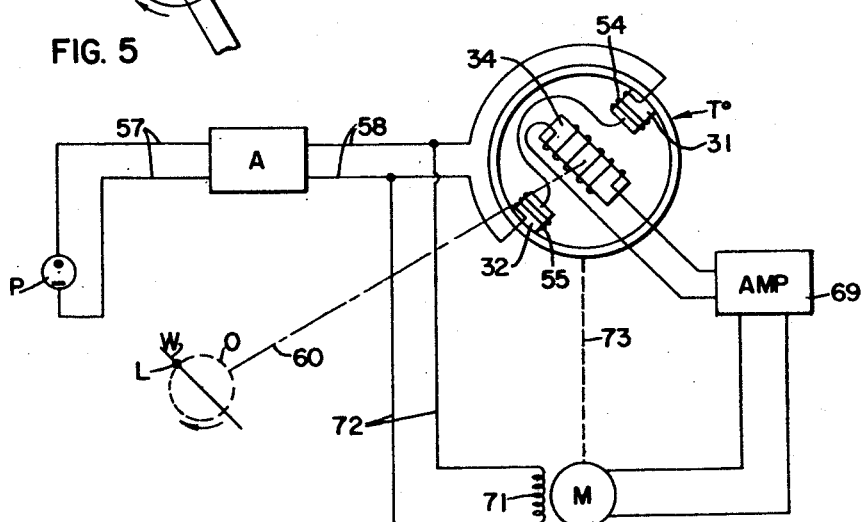
FIG. 4
INVENTOR
JOSEPH M. TYRNER
BY
ATTORNEYS Patented Sept. 19, 1950

2,522,851

UNITED STATES PATENT OFFICE 2,522,851

AUTOMATICALLY STEERED TRACER

Joseph M. Tyrner, Mendham Township, Morris County, N. J., assignor to Air Reduction Company, Incorporated, a corporation of New York Application July 16, 1949, Serial No. 105,161

11 Claims. (Cl. 318—162)

This invention relates to electronically controlled tracers for guiding the course of an instrumentality such as a cutting or welding torch in accordance with a drawing or pattern. Tracers of this kind are commonly used on universal cutting or welding machines such as those of the pantograph type, or the folding parallelogram type, in which a gas cutting or welding torch and the tracer are both mounted on the machine for unitary movement and for universal movement in a plane so that when the tracer is caused to follow the outline of the drawing or pattern the torch will be moved in a path which duplicates the pattern.

The usual type of electronic tracer comprises a power-driven traction wheel that rolls on the surface containing the drawing or pattern. A spot of light is projected on the line forming the outline of the drawing or pattern and the light is reflected into a photoelectric cell. Whenever the spot of light deviates slightly from the line of the pattern the amount of light received by the photoelectric cell changes, and this results in an automatic operation of the steering mechanism to change the orientation of the traction wheel, i. e., the direction in which the traction wheel is headed, so as to adjust the position of the tracer enough to bring the spot of light back to its normal position with respect to the pattern line. Electronic tracers of this sort therefore utilize small changes in intensity of the reflected light received by the photoelectric cell to effect the correction in the direction of movement of the tracer, and in order to make them operate satisfactorily it is necessary to use an expensive and highly sensitive steering system; otherwise the light intensity affecting the photoelectric cell must change considerably before the steering mechanism responds and this causes the tracer to "hunt" back and forth across the pattern line instead of following a smooth course.

The principal object of this invention is to provide an electronic tracer having a steering system which does not depend for its operation upon small variations in the light intensity affecting the photoelectric cell and which is free from hunting and does not require the use of expensive anti-hunting or sensitizing equipment.

The invention contemplates an electronic tracer having a power-driven traction wheel provided with a steering system having two principal portions, namely, an electromagnetic traction wheel orientor and means for moving a scanning or sensing medium in a circular orbit such that it continually crosses and re-crosses the pattern line in rapid succession. The traction wheel orientor is controlled by the scanning medium. So long as the scanning medium, when crossing the pattern line in one direction, crosses it at a predetermined point in the scanning medium's orbit, as will be the case when the tracer is following a straight portion of the pattern line, the traction wheel orientor will have no effect on the traction wheel and the wheel will therefore continue to steer the tracer in a straight line along the straight portion of the pattern, but when the tracer deviates from the path dictated by the pattern line or when it reaches a portion of the pattern line that has a change in direction, the scanning medium when crossing the pattern line in the above-mentioned direction will then cross it at a different point in the scanning medium's orbit and this will cause the traction wheel orientor to make an adjustment in the orientation of the traction wheel and thus steer the tracer back on its intended course or in the new direction taken by the pattern line. Means are provided for eliminating any effect on the traction wheel orientor when the scanning medium crosses the pattern line in the opposite direction during the other half of its circular movement. In the preferred form of the invention the scanning medium is a spot of light and it controls the electromagnetic traction wheel orientor through a photoelectric cell and an electronic circuit in which the traction wheel orientor is connected, but the scanning medium may, if desired, be a contact element which, when it crosses the pattern line, completes the circuit in which the traction wheel orientor is connected.

The invention will be better understood from the following description and by reference to the accompanying drawings which disclose preferred embodiments of it.

In the drawings:

Fig. 3 is a diagrammatic illustration of one form of steering system that may be used in the tracer;

Fig. 4 is a diagrammatic illustration of a modified form of steering system that may be used; and Fig. 5 is an enlarged explanatory view showing a portion of a pattern line and successive positions of the scanning medium orbit along the line as the tracers follows the line.

Figure 1:
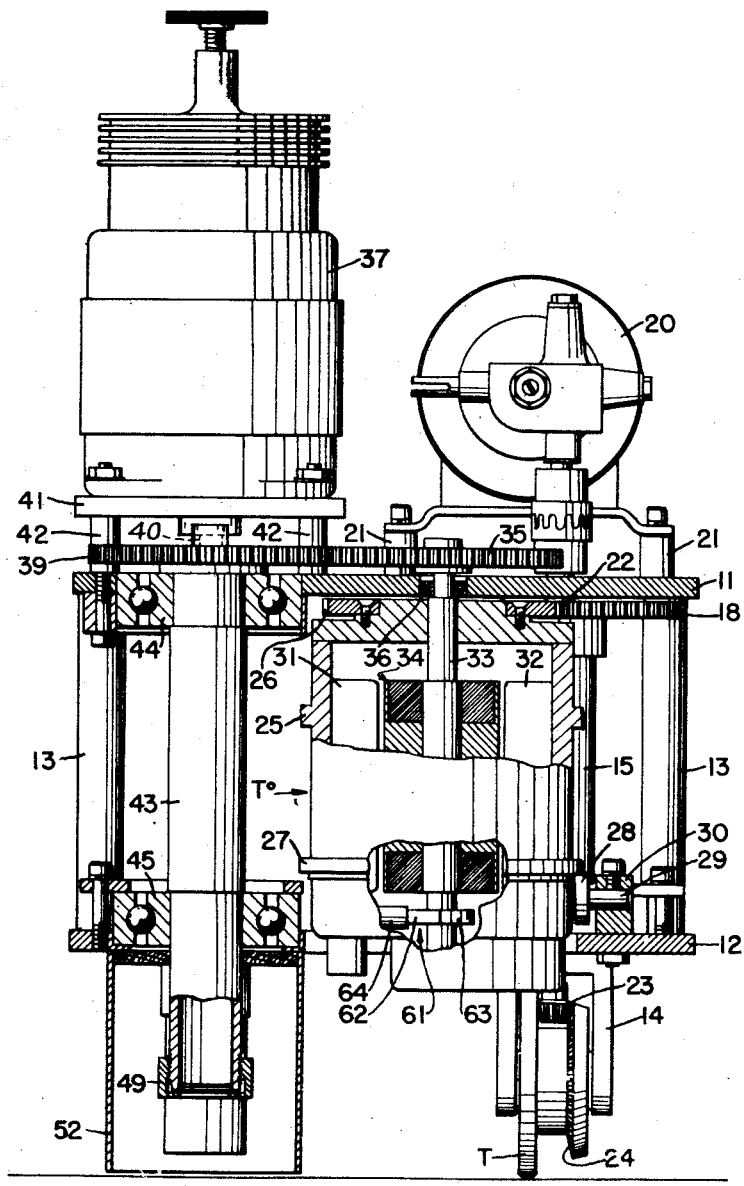
Figure 1 is a front elevation, partly in section, of an electronic tracer embodying the invention.
Figure 2:
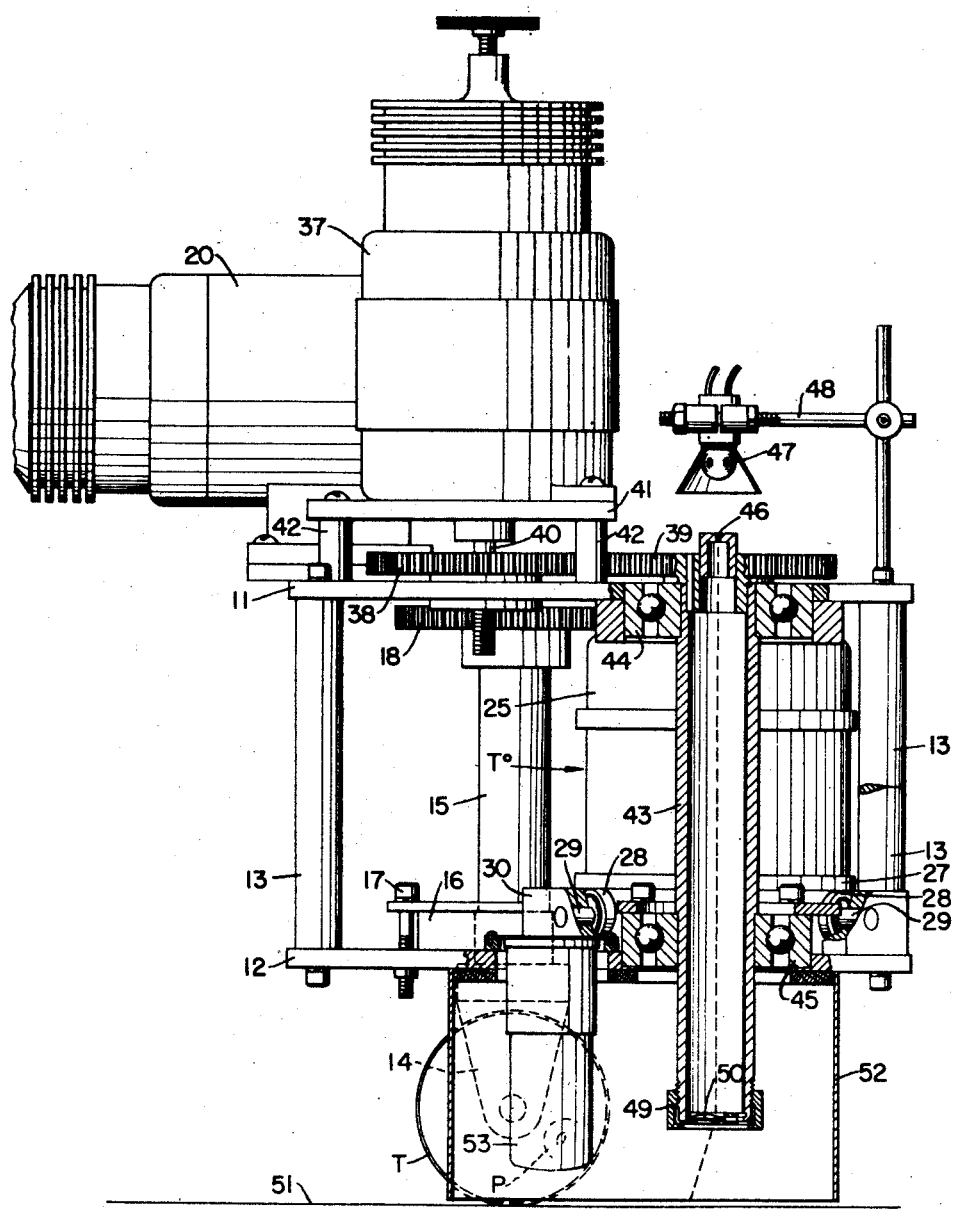
Fig. 2 is a side elevation, partly in section, of the tracer of Fig. 1.

Referring to Figs. 1 and 2, there is shown a tracer having a supporting framework comprising essentially upper and lower plates 11 and 12 spaced from one another by columns 13 to form a rigid structure. The frame rides on a traction wheel T mounted in a bifurcated member 14 which is, in turn, supported on the lower end of a steering column 15. A bearing housing 16, as shown in Fig. 2, encloses a bearing (not shown) in which the steering column 15 is rotatably mounted. The housing is secured to the lower plate 12 by bolts 17. A gear 18 is fixed to the upper end of the steering column whereby the column may be rotated about its axis to steer or orient the traction wheel. A motor 20 mounted on supports 21, Fig. 1, on the upper plate 11, drives the traction wheel T through a drive shaft 22, located concentrically within the steering column, and bevel gear 23 which meshes with a bevel gear 24 on the traction wheel.

Mechanism for steering the traction wheel comprises an electromagnetic traction wheel orientor T⁰ having a rotatable casing 25 to the upper end of which is secured a gear 26 which meshes with the gear 18 to turn the column 15 and thereby the traction wheel. The casing 25 has a flange 27 by which it is supported on rollers 28, each of which rotates on a horizontal shaft 29 that is secured in a block 30 attached to lower plate 12. Two oppositely disposed field poles 31 and 32 are fixedly secured to the inner wall of the casing 25 of the traction wheel orientor and are therefore in fixed relation with the traction wheel because the casing and the steering column are geared to one another through gears 18 and 26. The positioning of the field poles in relation to the traction wheel, as shown in Fig. 1, is that which would be used with the form of steering system diagrammatically illustrated in Fig. 4, which will be subsequently described. In the preferred embodiment of the invention, however, that is when the steering system is of the kind illustrated in Fig. 3, the field poles would not be in the position relative to the traction wheel as shown in Fig. 1, but would be in a position at right angles to the one shown. Nevertheless, for clarity of description and for convenience, they are not here shown in the position which they would take in the preferred embodiment.

A shaft 33 is journaled in the casing 25 of the traction wheel orientor and carries a magnetic rotor or armature 34 disposed concentrically between the field poles 31 and 32. The shaft 33 extends through the upper end of the casing 25 and the gear 26 supported thereby and through a bearing housing 36 in plate 11. A gear 35 is secured to its upper end. The rotor 34 as well as the field poles 31 and 32 are provided with coils wound thereon for purposes subsequently set forth.

The gear 25 on the rotor shaft 33 is driven from a motor 37 through a gear 38 (Fig. 2) fixed on the armature shaft 40 of the motor and a gear 39 which acts as an idler gear between the gears 35 and 38. The motor 37 is supported on a platform 41 spaced from and supported by the upper plate 11 by spacers 42.

Gear 39 is mounted on the upper end of a hollow cylindrical tube 43 supported in the framework by roller bearings 44 and 45 carried by plates 11 and 12 respectively. Centrally located in the upper end of the tube 43 (Fig. 2) is a small circular opening 46 through which light from lamp 47, held above the tube on bracket 48, may pass. The lower end of the tube is threaded and carries a cap 49. A lens 50 is mounted in the cap and projects the beam of light, admitted to the tube through opening 46, onto the pattern surface 51. The lens 50 is offset from the center of the tube opening and deflects the beam of light from the axis of the tube. Consequently, as the tube 43 is rotated by the motor 37 through the gear 39, the light beam projected from lens 50 casts upon the pattern surface 51 a light spot which describes a circular path. If gears 35 and 39 are of the same size, as is intended and shown, it is clear that the light spot and the rotor 34 will rotate in unison and, therefore, always remain in the same relative positions with respect to each other. It is contemplated, as shown in Figs. 3 and 4, that the relative positioning be such that the longitudinal axis of the rotor 34 and the diameter of the light spot's circular path, on which the light spot lies, are parallel.

The region below the tube 43, in which the light spot is cast, is shielded from outside light by a surrounding hood 52 secured to the bottom plate 12 of the framework. The light cast upon the pattern surface 51 is reflected from the pattern and picked up in an electronic light-sensitive tube or photoelectric cell diagrammatically represented at P. The photoelectric cell is secured in a tubular shield 53 attached to the plate 12 within the light-shielding hood 52.

Referring to Fig. 3, the electronic control circuit for the steering system therein illustrated includes coils 54 and 55 wound on the field poles 31 and 32, respectively, of the traction wheel orientor T⁰ and a coil 56 wound on the rotor of the orientor. The photoelectric cell P is connected by wires 57 to an amplifier and any other electrical instrumentalities that may be necessary to place the energization of the coils 54, 55 and 56 of the traction wheel orientor under the control of the photoelectric cell. The amplifier and these other instrumentalities are denoted collectively by the reference letter A. The coils 54, 55 and 56 of the traction wheel orientor are connected in series and are therefore energized simultaneously. Slip rings or other convenient means ordinarily used to provide electrical contact for relatively moving parts may be used to allow rotation of the rotor coil 56 between the field pole coils 54 and 55 but are not shown in the drawing in order to simplify the diagram. The coils 54 and 55 produce a magnetic field whose flux path extends between the field poles 31 and 32, and the coil 56 produces a second magnetic field which revolves with the rotor 34.

As before described, the rotor 34 of the traction wheel orientor is associated with the light source so that it rotates in unison with the light spot shown at L. This association is symbolized by the dotted line 60. The light spot revolves through a small circular path or orbit shown somewhat exaggerated in size at O. The photoelectric cell P responds only when the light spot crosses the pattern line, a portion of which is represented at W, and the coils of the traction wheel orientor are therefore energized only at this instant. Consequently, magnetic attraction between the rotor of the traction wheel orientor and its field poles 31 and 32 exists only at the time the light spot crosses the pattern line. The pattern line may be a dark line on a light background or a light line on a dark background. In the former case the amount of light received by the photoelectric cell will be decreased when the light spot crosses the pattern line and in the latter case it will be increased. The effect produced on the photoelectric cell in either case is herein referred to as the "response" of the cell and this response may be utilized in a well-known manner through the above-mentioned amplifier and other instrumentalities A to bring about energization of the coils of the traction wheel orientor when, and only when, the light spot crosses the pattern line.

The steering force created when the photoelectric cell P responds is a result of the magnetic attraction between the poles of the rotor or armature 34 and the field poles 31 and 32 of the traction wheel orientor caused by the energization of the windings 54, 55 and 56 and depends for its magnitude upon the angular relationship between the rotor and the field poles. When the rotor 34 is in alignment with the field poles 31 and 32 at the time the light spot crosses the pattern line and the photoelectric cell responds there is no torsional force between them, but if there is an angular relation between the field poles and the rotor at this time, then there is a torque which turns the field poles 31 and 32 toward the position of alignment with the rotor, thereby reorienting the traction wheel.

When the tracer is properly moving along a straight portion of the pattern line W (Fig. 3) the circular orbit O of the light spot is symmetrically disposed with respect to the pattern line. The traction wheel T will have the same orientation as the pattern line and so will the axis of the two field poles 31 and 32. Under these conditions the response of the photoelectric cell each time the spot of light crosses the pattern line at point X will have no effect on the traction wheel because the field poles 31 and 32 of the traction wheel orientor will be in alignment with its rotor 34. The tracer will therefore follow the pattern line along a straight course so long as the symmetrical relation between the light spot orbit and the pattern line exists and the light spot therefore continues to cross the pattern line at the point X which is the midpoint of the forward half of the light spot orbit, i. e., the half that is leading when the orbit is progressing along the pattern line. It should be understood at this point that the bar of the torch cutting or other machine to which the tracer is attached moves so that its successive positions are parallel, and since the tracer is rigidly attached to the bar the successive positions of the tracer are also parallel, i. e., the tracer always moves parallel to itself. Therefore, the leading half of the light spot orbit at any moment while the tracer is moving and being guided by the pattern line is that half whose subtended cord happens to be at right angles to the direction of movement of the tracer at that moment. It makes no difference at what point in the rearward or trailing half of the light spot orbit the light spot crosses the pattern line in the opposite direction because, as hereinafter described, means are provided to prevent the response of the photoelectric cell which occurs at this time from having any effect on the steering of the traction wheel.

If the tracer should deviate from the course dictated by the pattern line W, the light spot orbit will be shifted laterally with respect to the pattern line and destroy the symmetrical relation between them. The dotted line W', and the light spot orbit O, depict such an unsymmetrical relationship between the orbit and the pattern line brought about by a deviation of the tracer from its proper course that shifts the light spot orbit to the right relative to the pattern line as viewed in Fig. 3. When the light spot then crosses the pattern line W' during its movement through the forward or leading half of its orbit the crossing will occur before the light spot reaches the midpoint of the leading half of the orbit and the field poles 31 and 32 of the orientor will then have the angularly offset relationship with its rotor 34 shown in Fig. 3, and therefore the energization of their coils at the time the light spot crosses the pattern line will cause the field poles to move toward alignment with the rotor and by means of the connections before described reorient the traction wheel T (counterclockwise as viewed in Fig. 3) to steer the tracer in a direction that will move the light spot orbit back toward its symmetrical relationship with the pattern line. Thus it will be seen that whenever the light spot, in moving through the leading half of its orbit, crosses the pattern line at any point other than the midpoint of the leading half of the orbit, the traction wheel orientor will function to change the orientation of the traction wheel accordingly. Of course, the amount that the traction wheel is reoriented at each crossing of the pattern line by the light spot may be small and a number of crossings will be required to complete the steering action of the traction wheel and the steering of the tracer back toward and then along its proper course, but the crossings of the pattern line by the light spot occur in such rapid succession that the steering effect on the traction wheel is almost continuous. Although the speed of revolution of the light spot and the diameter of its orbit may vary considerably, it has been found that satisfactory steering of the tracer is obtained when the light spot is revolved at about 3600 R. P. M. and the circular orbit of the light spot is about $\tfrac{1}{16}$" in diameter.

When the light spot progresses in its orbital path to the point X' at which it crosses the pattern line W' a second time, but in the opposite directon, the rotor 34 of the traction wheel orientor will be in a positon such that if the coils of the orientor were energized the orientor would tend to turn the traction wheel in a direction that would steer the tracer in the wrong direction. In order to prevent this and to permit only one steering action on the traction wheel in each cycle of the light spot, a blanking switch 61 is provided. This switch comprises two half segments 62 and 63 that rotate against a brush contact 64 and in synchronism with the rotor 34 and the light spot L. The switch alternately opens and closes a circuit 65, which when closed causes the photoelectric cell to be electrically connected to the coils of the traction wheel orientor, and when opened causes the photoelectric cell to be electrically disconnected from the coils. The segment 62 is a conducting segment, and when it is in contact with brush 64, the circuit 65 is closed. The segment 63 is a non-conducting segment, and when it is in contact with the brush 64 the circuit 65 is open. Thus, when the non-conducting segment 63 is in contact with the brush 64 the coils of the traction wheel orientor will not be energized even when the photoelectric cell responds upon the crossing of the pattern line by the light spot. The two segments of the switch are so oriented with respect to the light spot, and the angular position of brush 64 relative to the rotation of the switch segments is such, that the brush will be in contact with the conducting segment 62 during the time that the light spot is moving through the forward or leading half of its orbit and will be in contact with the non-conducting segment 63 during the time that the light spot is moving through the rearward or trailing half of its orbit. The angular position of the brush 64 relative to the rotation of the conducting segment 62 should be such that the brush is in contact with the midpoint of the conducting segment at the time the light spot is at the midpoint of the leading half of its orbit, and this condition is maintained by causing each change in the orientation of the traction wheel (which causes a different portion of the light spot orbit to then become the leading half of the orbit) to produce a corresponding change in the angular position of the brush. One way to accomplish this is to mount the brush 64 on a rotatable frame 66 which is geared to the casing 25 of the traction wheel orientor by means of an intermediate gear 57 as diagrammatically shown in Fig. 3. If the switch contacts 62 and 63 are mounted on the same shaft as the rotor 34 of the orientor as in Fig. 1, then the brush 64 may be mounted directly on the casing 25 of the orientor in the proper position circumferentially of it, and since it is the turning of this casing that changes the orientation of the traction wheel, the desired shifting of the angular position of the brush will then occur with each turning movement of the casing 25 that changes the orientation of the traction wheel. In Fig. 1 the brush 64 is mounted in this manner on the casing 25, it being shown as a metal spring clip secured to and projecting inwardly from the side wall of the casing into contact with the switch segments 62 and 63.

It will now be seen that regardless of the direction of movement of the tracer and the direction in which the light spot orbit progresses along the pattern line, and regardless of what portion of the light spot orbit constitutes the leading half of the orbit, the blanking switch 61 will function to permit energization of the coils of the traction wheel orientor when the light spot crosses the pattern line at any time during its movement through the leading half of its orbit but not when the light spot crosses the pattern line a second time during its movement through the trailing half of its orbit. Instead of using a blanking switch of the kind above described to accomplish this, any other suitable means may be employed.

Fig. 5 illustrates the action of the steering mechanism in causing the tracer to follow an angular bend in the pattern line. In this figure W'' represents a portion of the pattern line having an angular bend; the circles $0^1$, $0^2$, $0^3$ and $0^4$ represent some of the successive positions of the light spot orbit along the portion of the pattern line that has the angular bend; and arrows $a^1$, $a^2$, $a^3$ and $a^4$ represent some of the successive changes in the orientation of the traction wheel that occur as it moves the tracer along the portion of the pattern line with the angular bend, and therefore also represent the path followed by the tracer in making the angular turn. Circle $0^1$ represents the position of the light spot orbit immediately before it reaches the bend in the pattern line. At this time the tracer is therefore being guided by a straight portion of the pattern line and the steering mechanism operates to steer the tracer along a corresponding straight course and to keep the light spot orbit symmetrically disposed with respect to the pattern line as already described in connection with Fig. 3. The circle $0^2$ represents the position of the light spot orbit after the tracer has progressed far enough for the leading part of the orbit to intersect the pattern line at a point beyond the bend in the pattern line. The light spot in moving through the leading half of its orbit will then cross the pattern line sooner than it would have if the pattern line had continued straight without a bend. Therefore, the photoelectric cell will respond and the coils of the traction wheel orientor will be energized when the rotor 34 (Fig. 3) of the orientor has not yet reached its position of alignment with the field poles 31 and 32. Thus, when the light spot crosses the pattern line the field poles 31 and 32 of the orientor will be moved toward their position of alignment with the rotor and reorient the traction wheel to the direction represented by arrow $a^2$. This arrow therefore represents the direction of movement of the tracer until the next response of the photoelectric cell and the next change in the orientation of the traction wheel. Circle $0^3$ represents the position of the light spot orbit after the tracer has progressed still farther, and again the light spot in moving through the leading half of its orbit will cross the pattern line when the rotor of the traction wheel orientor has not yet reached its position of alignment with the field poles and therefore the orientation of the traction wheel will again be changed to the direction indicated by the arrow $a^3$ which therefore represents the direction of movement of the tracer during the succeeding cycle of the light spot. Circle $0^4$ represents the position of the light spot orbit when the tracer has progressed far enough to cause the orbit to lie wholly on the portion of the pattern line beyond the bend. Since the light spot orbit is now on a straight portion of the pattern line having no bend, the traction wheel will not be reoriented when the light spot crosses the pattern line in moving through the leading half of its orbit and the tracer will therefore continue to move in the direction of the arrow $a^4$ as long as this portion of the pattern line remains straight. It will be seen from the series of arrows representing the path followed by a point on the tracer that the tracer does not turn quite as abruptly as the pattern line but makes a more gradual turn. However, this tendency to "cut corners" is characteristic of all electronically steered tracers.

While only four positions of the light spot orbit are shown in Fig. 5, it will be understood that for the amount of movement of the tracer represented in this figure the light spot would actually move in a great many more circular paths than the four shown. Also, because of the movement of the tracer, the light spot would not move in a succession of truly circular paths but would follow a continuous path which has a spiral form. However, the rapid speed of revolution of the light spot causes each of its revolutions to describe a path which so closely approximates a true and complete circle that the paths may be considered a succession of circles for explanatory purposes.

If desired, the winding 56 on the rotor of the traction wheel orientor may be omitted and the field winding 54 connected directly to the field winding 55. In this case the rotor is preferably a permanent magnet or made of soft iron to produce good magnetic attraction between it and the field poles. Similarly, the field windings 54 and 55 may be omitted and the winding of the rotor connected directly to the amplifier A, in which case the field poles are preferably permanent magnets or made of soft iron.

A modified form of steering system embodying the invention is shown diagrammatically in Fig. 4. It differs from the system previously described, principally in the nature of the traction wheel orientor and the way in which it changes the orientation of the traction wheel. Instead of utilizing the magnetic attraction between the rotor and field poles of the orientor to reorient the traction wheel as in the system previously described, the orientor generates an electromotive force when the spot of light, in moving through the leading half of its orbit, crosses the pattern line at any point other than the midpoint of the leading half of the orbit, and this electromotive force is amplified and utilized to operate an auxiliary steering motor which is directly coupled to the traction wheel. The coils 54 and 55 of the field poles of the orientor are electrically connected to the photoelectric cell through the amplifier A as before, but the coil 68 of the rotor 34 is not connected in series with them but is connected in a separate circuit including an amplifier 69 and the armature winding of a steering motor 70 which is operatively connected with the traction wheel. This motor has a field winding 71 which is connected across the amplifier A at its output side by wires 72 and is therefore energized whenever the photoelectric cell responds. When the light spot crosses the pattern line at the midpoint of the leading half of its orbit the rotor 34 is at right angles to the axis of the field poles 31 and 32 instead of in alignment with them as in the steering system previously described. The rotation of the rotor at this instant will cause little or no electromotive force to be generated in the rotor coil 68 despite the fact that the coils of the field poles are then energized because the flux lines between the field poles are not crossed by the turns of the rotor coil in this position of the rotor. Consequently no voltage is impressed on the motor 70 through the amplifier 69 and there is therefore no steering impulse at this time. However, should the light spot, in moving through the leading half of its orbit, cross the pattern line at any other point than the midpoint of the leading half of the orbit the rotor 34 will at that time be moving through a position in which it is more nearly in alignment with the field poles and the flux lines between the field poles will then be crossed by the turns of the rotor coil in such a way as to generate an electromotive force in the rotor coil. The electromotive force amplified by the amplifier 69 energizes the armature winding of the motor 70 which steers the traction wheel. The casing 25 of the traction wheel orientor is geared to the steering column, as indicated by the dotted line 73, so that whenever the orientation of the traction wheel is changed the orientation of the casing 25 and the field poles 31 and 32 is changed accordingly. Thus, the electromotive force generated in the rotor coil 68 is utilized to change the orientation of the traction wheel through the intermediary of the steering motor 70 but it will be apparent that the direction in which the traction wheel is turned depends upon whether the light spot crosses the pattern line in advance of or beyond the midpoint of the leading half of the light spot orbit, and consequently upon whether the rotor 34 is in advance of or beyond its perpendicular position with respect to the field poles 31 and 32 because the direction of the current in the rotor winding will depend upon the latter condition. The acceleration of the motor 70 increases with a decrease in the angularity between the rotor and the field poles of the traction wheel orientor at the time the light spot crosses the pattern line because the voltage generated in the rotor winding and supplied to the steering motor will be greatest when the rotor is directly in line with the field poles due to the fact that the number of lines of flux then crossed by the turns of the rotor coil will be at a maximum.

A blanking switch of the kind employed in the steering system of Fig. 3 is also preferably used in the modified form of the steering system just described but is not shown in Fig. 4.

I claim:

1. An automatically steered tracer adapted to be guided along a surface by a pattern line, comprising a body portion, a power-driven traction wheel for propelling the tracer along the surface, a mounting for the traction wheel which is rotatable about a vertical axis to steer or orient the traction wheel, an electromagnetic traction wheel orientor operatively connected to said mounting, means on said body portion for moving a scanning medium in a circular orbit on the pattern surface so that the orbit can follow the pattern line as the tracer moves over the pattern surface, an electric circuit in which a part of the traction wheel orientor is electrically connected and which is adapted to be energized by a crossing of the pattern line by the scanning medium, the orientor being ineffective to change the orientation of the traction wheel when the scanning medium orbit is in a normal position relative to the pattern line and the scanning medium crosses the pattern line at a midpoint of a half of the orbit whose subtended cord is at right angles to the direction in which the tracer is moving at the moment but being adapted to change the orientation of the traction wheel when the scanning medium is moving through said half of its orbit crosses the pattern line in advance of or beyond said midpoint to steer the tracer in a direction that will shift the scanning medium orbit back toward said normal position relative to the pattern line.

2. An automatically steered tracer adapted to be guided along a surface by a pattern line, comprising a body portion, a power-driven traction wheel for propelling the tracer along the surface, a mounting for the traction wheel which is rotatable about a vertical axis to steer or orient the traction wheel, an electromagnetic traction wheel orientor operatively connected to said mounting, and means on said body portion for moving a scanning medium in a circular orbit on the pattern surface so that the orbit can follow the pattern line as the tracer moves over the pattern surface, said traction wheel orientor being under the control of said scanning medium and being ineffective to change the orientation of the traction wheel when the scanning medium orbit is in normal position relative to the pattern line and the scanning medium crosses the pattern line at a midpoint of the leading half of the orbit but being adapted to change the orientation of the traction wheel when the scanning medium in moving through said leading half of its orbit crosses the pattern line in advance of or beyond said midpoint to steer the tracer in a direction that will shift the scanning medium orbit back toward said normal position relative to the pattern line.

3. An automatically steered tracer adapted to be guided along a surface by a pattern line, comprising a body portion, a power-driven traction wheel for propelling the tracer along the surface, a mounting for the traction wheel which is rotatable about a vertical axis to steer or orient the traction wheel, an electromagnetic traction wheel orientor operatively connected to said mounting, means on said body portion for casting a light spot on the pattern surface, means for moving the light spot in a circular orbit on the pattern surface so that the orbit can follow the pattern line as the tracer moves over the pattern surface, and electric circuit in which the traction wheel orientor is electrically connected, light-sensitive means also connected in said circuit and positioned to receive reflected light from said light spot and being responsive each time the light spot crosses the pattern line to thereby cause energization of the traction wheel orientor, the traction wheel orientor being ineffective to change the orientation of the traction wheel when the light spot orbit is in a normal position relative to the pattern line and the light spot crosses the pattern line at a mid point of a half of the orbit whose subtended cord is at right angles to the direction in which the tractor is moving at the moment but being adapted to change the orientation of the traction wheel when the light spot in moving through said half of its orbit crosses the pattern line in advance of or beyond said midpoint to steer the tracer in a direction that will shift the light spot orbit back toward said normal position relative to the pattern line.

4. An automatically steered tracer in accordance with claim 3 having a blanking switch connected in said circuit, and means for operating the blanking switch so that the traction wheel orientor is effective to change the orientation of the traction wheel at one crossing only of the pattern line by the light spot during a complete revolution of the light spot.

5. An automatically steered tracer adapted to be guided along a surface by a pattern line, comprising a body portion, a power-driven traction wheel for propelling the tracer along the surface, a mounting for the traction wheel which is rotatable about a vertical axis to steer or orient the traction wheel, an electromagnetic traction wheel orientor operatively connected to said mounting, means on said body portion for casting a light spot on the pattern surface, means for moving the light spot in a circular orbit on the pattern surface so that the orbit can follow the pattern line as the tracer moves over the pattern surface, an electric circuit in which the traction wheel orientor is electrically connected, light-sensitive means also connected in said circuit and positioned to receive reflected light from said light spot and being responsive each time the light spot crosses the pattern line to thereby cause energization of the traction wheel orientor, the traction wheel orientor being ineffective to change the orientation of the traction wheel when the light spot orbit is in a normal position relative to the pattern line and the light spot crosses the pattern line at a midpoint of the leading half of the orbit but being adapted to change the orientation of the traction wheel when the light spot in moving through said leading half of its orbit crosses the pattern line in advance of or beyond said midpoint to steer the tracer in a direction that will shift the light spot orbit back toward said normal position relative to the pattern line.

6. An automatically steered tracer in accordance with claim 5 in which said electromagnetic orientor comprises relatively movable magnetic parts at least one of which has a winding connected in said electric circuit, the tracer having means for rotating one of said parts in synchronism with said light spot, means operatively connecting the other of said parts with the traction wheel, said parts of the orientor being in such a relative position when the light spot crosses the pattern line at a midpoint of the leading half of the light spot orbit that energization of said winding at that time will have no effect in causing the orientor to change the orientation of the traction wheel but being in such relative position when the light spot crosses the pattern line in advance of or beyond said midpoint that energization of said winding then causes the orientor to steer the traction wheel in a direction that will shift the light spot orbit back toward the position in which the light spot will cross the pattern line at said midpoint of the leading half of the light spot orbit.

7. An automatically steered tracer in accordance with claim 5 in which said electromagnetic orientor comprises relatively movable magnetic parts at least one of which has a winding connected in said electric circuit, the tracer having means operatively connecting one of said parts with the traction wheel, and means for rotating the other of said parts in synchronism with said light spot such that when the light spot crosses the pattern line at a midpoint of the leading half of the light spot orbit said parts of the orientor will be substantially aligned and energization of said winding at that time will therefore have no effect in causing the orientor to change the orientation of the traction wheel but when the light spot crosses the pattern line in advance of or beyond said midpoint said parts of the orientor will be out of alignment and the energization of said winding will then cause the parts to move toward alignment whereby the traction wheel is steered in a direction that will shift the light spot orbit back toward the position in which the light spot will cross the pattern line at said midpoint of the leading half of the light spot orbit.

8. An automatically steered tracer in accordance with claim 5 in which said electromagnetic orientor comprises a field pole and an armature pole at least one of which has a winding connected in said electric circuit, the tracer having means for rotating said armature pole in synchronism with said light spot, means operatively connecting said field pole with the traction wheel so that they are maintained in a fixed position with respect to each other and so that when the field pole is moved about the axis of rotation of the armature pole the traction wheel is re-oriented correspondingly, the armature pole being substantially aligned with the field pole when the light spot crosses the pattern line at a midpoint of the leading half of the light spot orbit so that energization of said coil at that time will have no effect in changing the orientation of the traction wheel but the armature pole being out of alignment with the field pole when the light spot crosses the pattern line in advance of or beyond said midpoint whereby the magnetic attraction between the armature pole and the field pole when the said coil is energized will cause the field pole to move toward its aligned position with the armature pole and thereby steer the traction wheel in a direction that will shift the light spot orbit back toward the position in which the light spot will cross the pattern line at said midpoint of the leading half of the light spot orbit.

9. An automatically steered tracer in accordance with claim 8 in which said field pole and said armature pole both have windings connected in said electric circuit.

10. Automatically steered tracer in accordance with claim 9 in which said windings are connected in series.

11. An automatically steered tracer adapted to be guided along a surface by a pattern line, comprising a body portion, a power-driven traction wheel for propelling the tracer along the surface and which is movable about a vertical axis so that it can be oriented or steered, an electromagnetic traction wheel orientor, means on said body portion for casting a light spot on the pattern surface, means for moving the light spot in a circular orbit on the pattern surface so that the orbit can follow the pattern line as the tracer moves over the pattern surface, said traction wheel orientor having field poles maintained in fixed relation with the orientation of the traction wheel and provided with windings, an electric circuit in which said windings are electrically connected, light-sensitive means also connected in said circuit and positioned to receive reflected light from said light spot and being responsive each time the light spot crosses the pattern line to thereby cause energization of said field pole windings, the traction wheel orientor also having a rotor provided with a winding, means for rotating said rotor in synchronism with said light spot, the energization of said field pole windings when the light spot crosses the pattern line and the rotation of said rotor causing a current to be induced in said rotor winding when the rotor has a predetermined relation with the field poles, and an electric motor operatively connected to the traction wheel to steer or orient it and being electrically connected to the winding on the rotor of the traction wheel orientor so as to be energized when current is induced in said rotor winding, the rotor and the field poles of the traction wheel orientor being in such relative position when the light spot crosses the pattern line at a midpoint of the leading half of the light spot orbit that insufficient current will be induced in said rotor winding to cause operation of said electric motor but being in such relative position when the light spot crosses the pattern line in advance of or beyond said midpoint that sufficient current will then be induced in said rotor winding to operate said motor to reorient the traction wheel.

JOSEPH M. TYRNER.

No references cited.